United States Patent [19]

Carbenay

[11] Patent Number: 4,784,179

[45] Date of Patent: Nov. 15, 1988

[54] AUTOMATIC PIPE COUPLING DEVICE

[75] Inventor: Pierre H. C. Carbenay, Montlouis sur Loire, France

[73] Assignee: Volumatic S.A., France

[21] Appl. No.: 59,375

[22] Filed: Jun. 8, 1987

[51] Int. Cl.$^4$ ........................................... F16K 11/18
[52] U.S. Cl. ............................... 137/607; 137/625.11; 137/625.46; 251/149.1; 285/18; 285/316
[58] Field of Search .................... 137/607, 874, 625.11, 137/625.46, 555, 558; 285/12, 18, 315, 316; 251/149.1, 149.6, 149.9

[56] References Cited

U.S. PATENT DOCUMENTS

| 1,846,877 | 2/1932 | Knapp | 251/149.6 X |
| 2,692,151 | 10/1954 | Melato | 251/149.9 |
| 3,538,948 | 11/1970 | Nelson | 137/554 |
| 3,581,768 | 6/1971 | Conti | 137/874 |
| 3,665,952 | 5/1972 | Chronister | 137/625.11 X |
| 3,741,248 | 6/1973 | Stevens | 137/607 X |
| 3,896,855 | 7/1975 | Grieger et al. | 137/625.46 X |
| 4,291,724 | 9/1981 | Miller | 137/555 |
| 4,418,712 | 12/1983 | Braley | 137/558 X |

Primary Examiner—Martin P. Schwadron
Assistant Examiner—Stephen M. Hepperle
Attorney, Agent, or Firm—McGlew and Tuttle

[57] ABSTRACT

The device comprises a plurality of pipes (7a to 7h) which may contain liquid under pressure and whose ends are radially fixed in a circle in a plane, a coupling unit (17) having an end communicating with another pipe (40) and rotatively mounted in the plane within the circle, means (16) for driving the unit in rotation, and means (21) for bringing its end in succession in coincidence with the ends of the plurality of pipes. The coupling unit is telescopic, its axis of rotation (12) extends through a bowl (2) and its movable end (26) communicating with the other pipe (40) cooperates with the ends of the pipes (7a to 7h) which are closed by automatic valves.

8 Claims, 2 Drawing Sheets

AUTOMATIC PIPE COUPLING DEVICE

FIELD AND BACKGROUND OF THE INVENTION

The present invention relates to a device for automatically and selectively coupling a pipe with any one of a plurality of other pipes.

In many industrial sectors, for example chemical engineering, the preparation of lubricants or the like, and in wine stores or other liquid depots, mixtures of different liquids coming from several reservoirs have to be made in a single vessel.

To obtain these mixtures it is necessary to make a number of successive connections between the pipe leading to the final vessel and the pipes connected to the various reservoirs containing the liquids to be mixed.

These connections or couplings of pipes have been for a long time made manually, which is time-consuming and fastidious.

A more rational and convenient system is known in which the ends of the pipes leading from the reservoirs containing the liquids to be mixed are aligned in parallel relation on a support and connected to a manifold leading to the final vessel through an equal number of valves. It is then sufficient to open in succession the valves corresponding to the various reservoirs.

Although this system is relatively practical and rapid it nonetheless has important drawbacks. In particular, some parts of the manifold and its nozzles for connection to the various valves constitute "dead ends" or sectors which are isolated and are more or less large, depending on the positions of the closed valves, in which a certain volume of more or less mixed liquid stagnates, which requires a draining and cleaning of these parts and represents a loss of a corresponding volume of liquid.

SUMMARY AND OBJECTS OF THE INVENTION

An object of the invention is to overcome these drawbacks by providing an automatic coupling device permitting a selective and sequential connection of a pipe with any one of a plurality of other pipes which may contain a liquid under a pressure not exceeding ten bars, adapted to be remote controlled and eliminating the multiple valves.

The invention therefore provides an automatic pipe coupling device which comprises a plurality of pipes whose ends are radially fixed in a circle in a plane, a coupling unit having one end communicating with another pipe and rotatively mounted in said plane within said circle, means for driving said unit in rotation, and means for bringing its end in coincidence with the ends of said plurality of pipes.

According to another feature of the invention, said coupling unit is mounted to rotate about a perpendicular axis at the center of the circle and the ends of the pipes disposed in a circle are each closed by an automatic valve.

According to another feature of the invention, said connecting unit is telescopic.

In a preferred embodiment of the invention, the circle is on a support fixed to the periphery of a bowl and the axis of rotation of said unit extends through the bottom of the bowl.

Advantageously, the means for driving the unit in rotation comprise a motor and a transmission located outside the bowl.

According to a further feature, the end of the telescopic coupling unit comprises a slidable sleeve and the means for bringing the end in coincidence with the ends of the pipes comprise a jack whose rod is adapted to shift the sleeve and open said automatic valves.

The following description, with reference to the accompanying drawings given as non-limiting examples, will explain how the present invention may be put into effect.

DESCRIPTION OF THE PREFERRED EMBODIMENT

Figure 1:
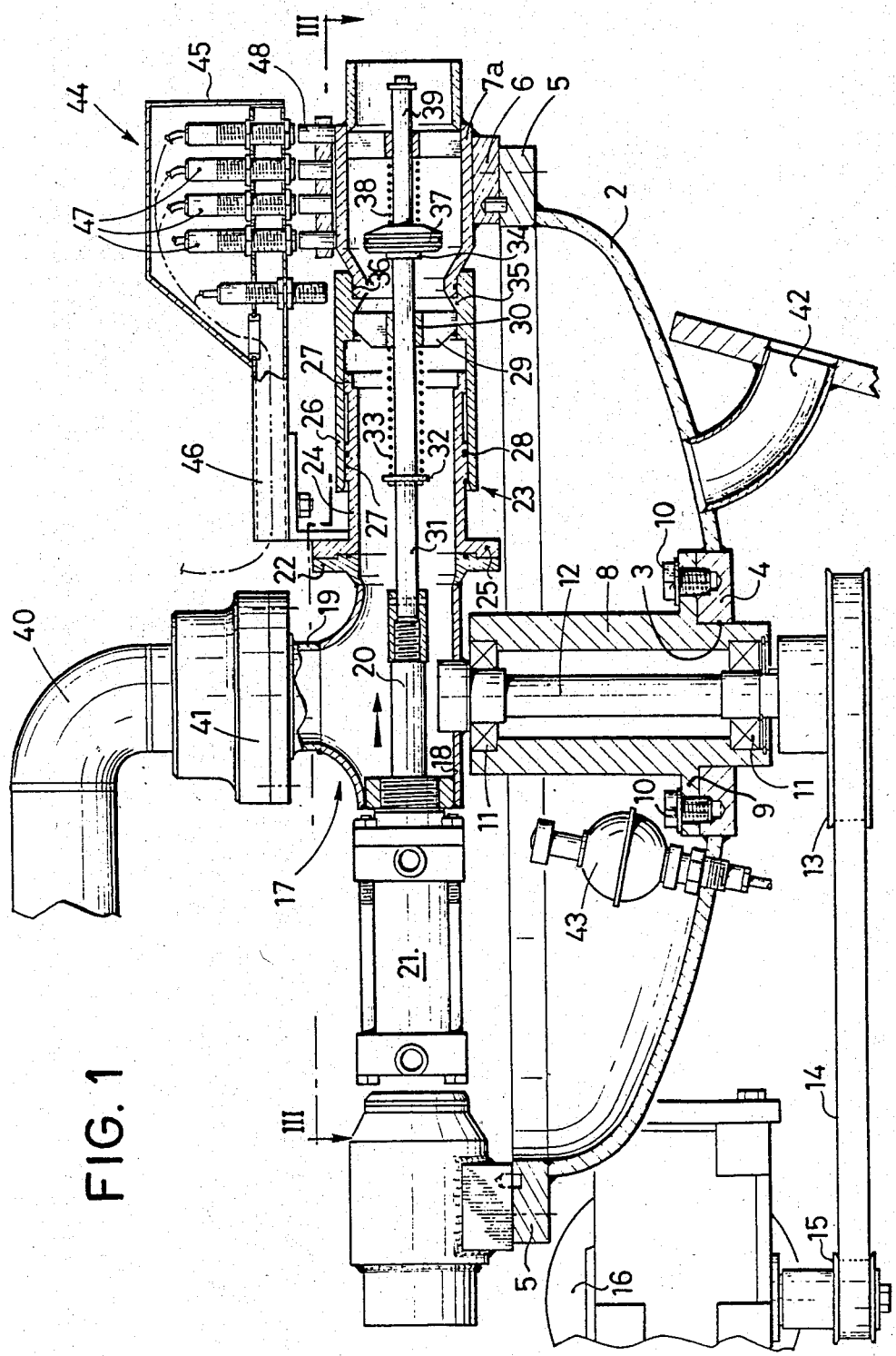
FIG. 1 is a view in side elevation and in section of an embodiment of the device according to the invention, showing the telescopic coupling in the active position.

With reference to the drawing, the device according to the invention essentially comprises a circular bowl 2 having a central aperture 3 defined by a reinforced flange 4 and a radial peripheral ledge 5.

Fixed to the peripheral ledge 5 by their individual base are for example eight coupling nozzles 7a to 7h which are oriented radially in the same plane and have ends projecting inwardly of the periphery of the bowl located on the same circle concentric with the bowl.

A tubular hub 8 is fixed in the aperture 3, on the flange 4, by a flange 9 and screws 10 so as to extend axially in the bowl 2.

The hub 8 carries in its end portions rolling bearings 11 in which is coaxially rotatively mounted a shaft 12 having end portions extending outside the hub 8.

On its end portion projecting out of the bowl 2 the shaft 12 carries a pulley 13 connected by a belt 14 to a second pulley 15 which is keyed on the shaft of a motor 16 for the purpose explained hereinafter.

At its opposite end, within the bowl, the shaft 12 carries a hollow inverted T-piece 17 fixed to the shaft by the median portion of its horizontal bar 18 so that its vertical bar 19 extends upwardly.

In the horizontal passage defined by the bar 18 extends a rod 20 of a piston of a jack 21 which is fixed, for example screwed, in one of the ends of the bar 18.

At its opposite end, the bar 18 of the T-piece 17 has a flange 22 whereby a telescopic coupling unit 23 may be fixed in the extension of the bar 18.

The telescopic coupling unit 23 comprises a fixed tube 24 having a flange 25 secured to the flange 22 and a movable tube or sleeve 26 slidably mounted on the fixed tube 24, on the bearing portions 27 of the latter, a sealing element 28 being preferably provided therebetween.

In its end opposed to the T-piece 17 the movable sleeve 26 has a spider 29 forming a smooth bearing 30 in which is slidable an extension 31 of the piston rod 20.

The extension 31 of the piston rod has a fixed abutment 32, a coiled spring 33 disposed around the extension 31 between the abutment 32 and the spider 29, and a head 34.

The end portion of the movable sleeve 26 has internally a shape which is complementary to that of the coupling nozzles 7a to 7h, with an internal abutment 35 and sealing means 36, the arrangement being such that the sleeve 26 which has a thrust exerted thereon by the jack 21, is capable of fitting itself in a sealed manner onto any one of the nozzles 7a to 7h, depending on the orientation given to the unit about the shaft 12 by the motor 16.

Each coupling nozzle 7a to 7h comprises internally an automatically-closed valve 37 of known type comprising a mushroom-shaped closure member biased to the closing position by a spring 38 disposed around its rod 39.

The device according to the invention also includes an outlet pipe 40 (or inlet pipe depending on the direction of flow) which is bent and connected to the vertical bar 19 of the T-piece 17 by a sealed swivel joint 41.

Advantageously, and according to the illustrated embodiment, there are also provided a drain pipe 42 which opens onto the interior of the bowl, a level indicator 43 and a position indicating system 44.

In the illustrated embodiment, the system 44 comprises a housing 45 carried by a radial arm 46 fixed to the flanges 22, 25 and coaxial with the telescopic unit 23.

Mounted within the housing 23 are sensors 47 which are radially disposed relative to the axis of the unit 23 so as to coincide with detachable blocks 48 which are also radially disposed but fixed in a different number on each coupling nozzle 7a to 7h. An electronic device of known type connected to the sensors permits the determination of the number of blocks 48 and thus a recognition of the nozzles 7a to 7h.

Figure 2:
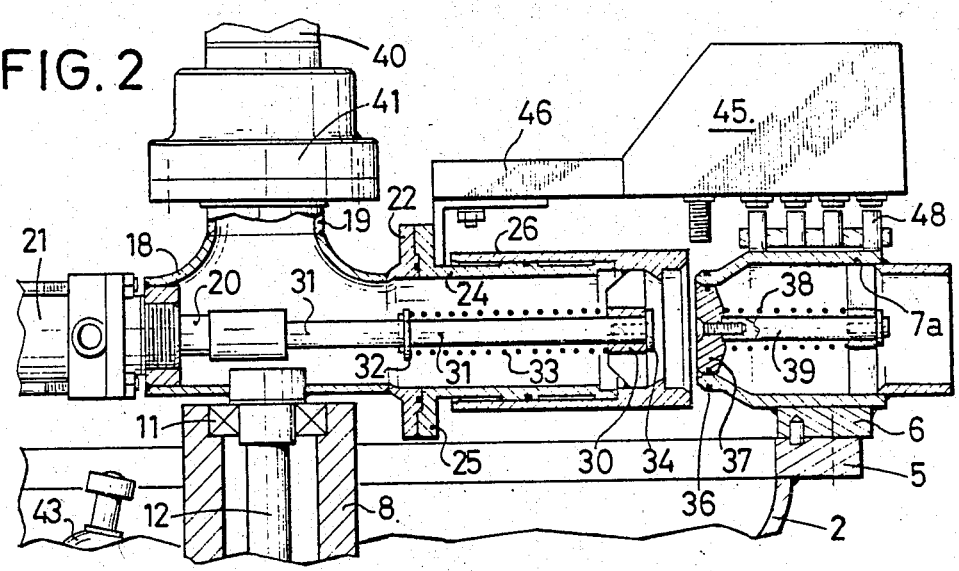
FIG. 2 is a partial sectional view of the telescopic coupling in the retracted inactive position.
Figure 3:
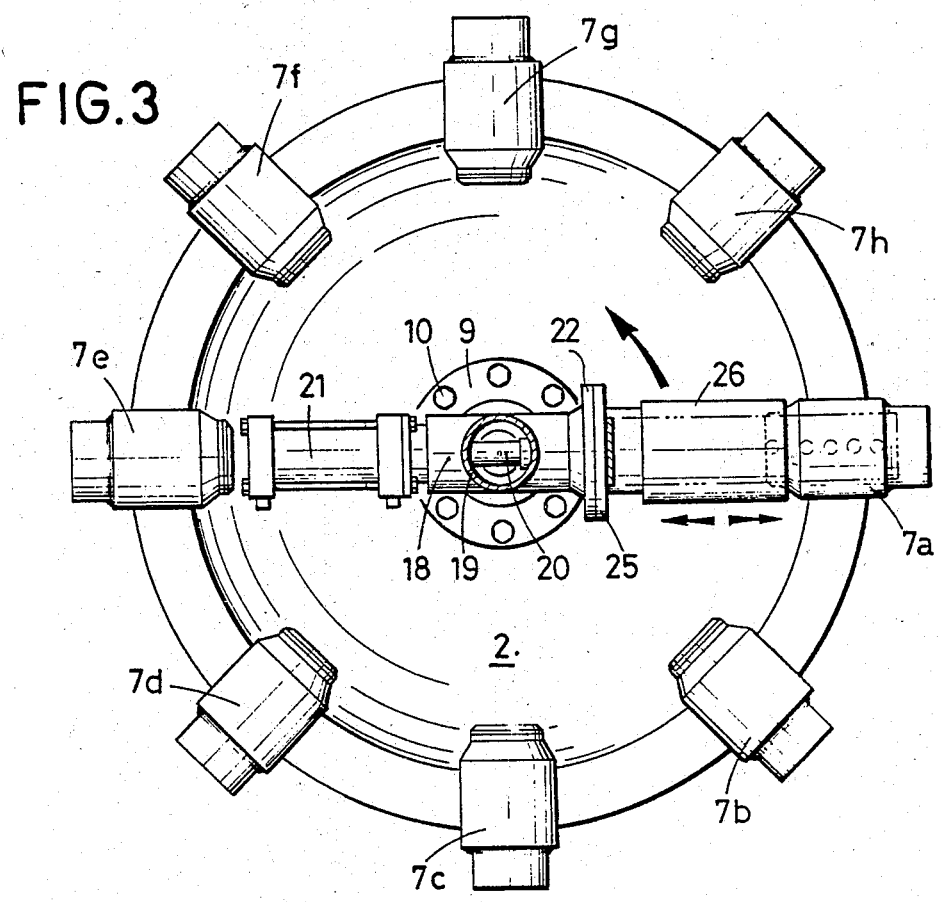
FIG. 3 is a plan view taken on line III—III of the device shown in FIG. 1.

The rotary coupling device according to the invention operates in the following manner:

It will be assumed that the device is in the position represented in FIG. 2 in which the coupling unit is in its retracted position.

In service, the coupling nozzles 7a to 7h are each connected to a reservoir (not shown) containing the liquids to be mixed which exert pressures on the valves 37, these pressures being proportional to the different liquid pressure heads in these reservoirs, and the central pipe 40 is connected to a mixture reservoir through a suction/delivery pump (not shown).

When it is desired to couple the central pipe 40 with any one of the coupling nozzles 7a to 7h (or inversely), the electric motor 16 is started up so as to bring the end of the movable sleeve 26 of the telescopic coupling unit in alignment with the desired coupling nozzle.

The jack 21 is then actuated so as to extend its piston rod 20. In a first stage, the abutment 32 compresses the spring 33 against the spider 29 and consequently shifts the movable sleeve 26 which, under the effect of the thrust of the spring 33, is engaged in a sealed manner on the end portion of the chosen coupling nozzle 7a to 7h (FIG. 1)

In a second stage, the rod of the piston and its extension 31 continue to advance and the head 34 of the latter comes into contact with the closure member 37 of the corresponding nozzle and thus opens the valve and puts the nozzle in communication with the central pipe.

When the desired quantity of liquid has been transferred (in one direction or the other), the jack 21 is actuated in the opposite direction and the operation is reversed.

The liquid surplus which may remain in the telescopic unit flows away and is received in the bowl 2. If the liquid level in the latter rises above a predetermined level, the level indicator 43 actuates a suitable visual or sound warning device of known type which indicates the necessity to empty the bowl through the pipe 42.

It will be understood that the device may be rendered fully automatic by known electronic means, of a type which may be programmed if desired, connected to the sensors 47 and to the motor 16 for bringing the telescopic unit selectively in alignment with the coupling nozzles in accordance with a predetermined sequence and also for commanding the operation of the pump and the draining means.

In a simpler alternative embodiment, which is not shown since it is less advantageous, the ends of the nozzles 7a to 7h may merely be orifices provided in a cylindrical surface and the end of the unit may be constituted by a block having a curved surface of the same radius adapted to slide into sealed contact with said cylindrical surface and provided with a passage communicating with the pipe 40, the rod of the piston of the jack 21 then merely serving to open the valves.

However, this arrangement would not provide a satisfactory seal under certain pressure conditions.

What is claimed is:

1. An automatic pipe coupling device, comprising: a plurality of pipes, each pipe adapted to contain liquid under pressure, each of said plurality of pipes having ends which are radially fixed in a circle in a plane and each of said pipes having an automatic valve closing each of said ends; a telescopic coupling unit having an end communicating with another pipe, the coupling unit being rotatively mounted substantially in said plane within said circle, the end of said coupling unit including a slidable sleeve, means for driving said unit in rotation; and, means for bringing the end of said unit in succession in coincidence with the ends of said plurality of pipes, said means for bringing the end of said unit in coincidence with the ends of said pipes including a jack having a rod adapted to shift said sleeve and open said automatic valve.

2. A device according to claim 1, wherein said coupling unit is mounted to be rotatable about a perpendicular axis at the centre of said circle.

3. A device according to claim 2, wherein said circle is on a support fixed to the periphery of a bowl and the axis of rotation of said unit extends through the bottom of said bowl.

4. A device according to claim 3, wherein said means for driving said unit in rotation comprise a motor and a transmission located outside said bowl.

5. A device according to claim 1, wherein the end of said rotary coupling unit communicates with said other pipe through a swivel joint.

6. A device according to claim 1, wherein the ends of said pipes are constituted by coupling nozzles having a shape which is complementary to the shape of said slidable sleeve so as to be capable of sealingly engaging with said sleeve.

7. A device according to claim 6, wherein said nozzles each carry a number of metal members and said rotary coupling unit carries sensors adapted to detect the presence of said members.

8. A device according to claim 3, further comprising draining means and a liquid level detector combined with said bowl.

* * * * *